O. ROYAL.
GREASE CUP.
APPLICATION FILED NOV. 27, 1918.

1,387,737. Patented Aug. 16, 1921.

Inventor:
Osmon Royal,
by Clyde L. Rogers
his atty.

UNITED STATES PATENT OFFICE.

OSMON ROYAL, OF BOSTON, MASSACHUSETTS, ASSIGNOR TO JOSEPH A. MAHONEY, OF BOSTON, MASSACHUSETTS.

GREASE-CUP.

1,387,737.  Specification of Letters Patent.  Patented Aug. 16, 1921.

Application filed November 27, 1918. Serial No. 264,455.

*To all whom it may concern:*

Be it known that I, OSMON ROYAL, a citizen of the United States, and resident of Boston, county of Suffolk, Commonwealth of Massachusetts, have invented an Improvement in Grease-Cups, of which the following description, in connection with the accompanying drawings, is a specification, like characters on the drawings representing like parts in each of the several views.

This invention relates to grease cups for use on machinery in general but especially adapted and designed for use on vehicles such as locomotive engines, automobiles and the like. A principal object of the invention is to provide a grease cup having a movable ejecting plug or plunger, with locking means for such plunger adapted to hold the same securely against casual displacement and loss. A further object is to provide a locking means of the kind stated that while holding the plunger secure, and not liable to casual tripping that would release the plunger, is at the same time most conveniently operable with a minimum of manipulation to release the plunger when required, the operating parts being guarded both against injury by meddlesome or accidental tampering, and also equipped so as to be not liable to clogging up or interference in function by ice, mud or other foreign matter. The foregoing and other objects and advantages of the invention will more fully appear from the following detailed description, and the distinctive features of novelty will be pointed out in the appended claims.

Referring to the drawings.

Figure 1:
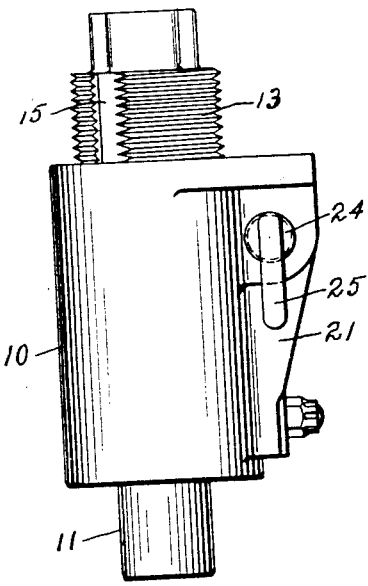
Figure 1 is a side elevation of a grease cup constructed in accordance with my invention.
Figure 2:
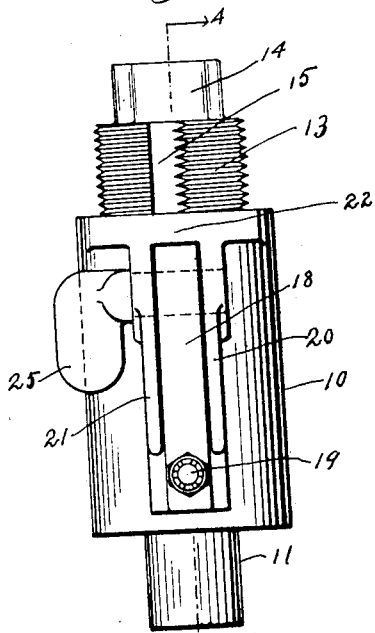
Fig. 2 is a front view thereof.
Figure 3:
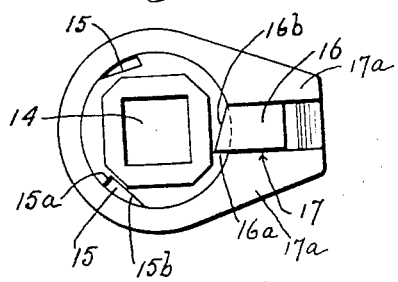
Fig. 3 is a plan view thereof.
Figure 4:
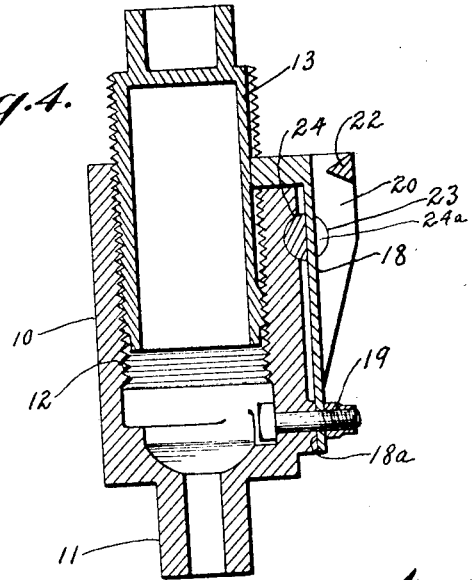
Fig. 4 is a central vertical section on line 4—4 of Fig. 2.

10 indicates the grease cup which is equipped with a suitable discharge nipple or reduced collar 11 adapted to be fitted to the bearing housing. This cup is internally threaded as indicated at 12 to receive a hollow externally threaded plunger plug 13 which is adapted to be removed to permit filling of the cup and then screwed in gradually to eject the grease contents thereof,—it being understood that where the term "grease" is used herein it is intended to include any fluid, semi-fluid or flowable material requiring to be ejected gradually and in predetermined quantities from a container. For turning down the plunger 13 its upper end is formed with a squared tool receiving socket 14. For locking this plunger against casual working out or displacement it is provided with one or more notches or grooves 15 extending the length thereof, three of these notches spaced around the circumference of the plug being shown. In accordance with my invention these notches present squared or substantially radial shoulders $15^a$ at the forward sides thereof which are engageable by the corresponding face $16^a$ of a locking dog 16 which is thus adapted to hold the plug against turning backward. The rear side $15^b$ of the notches 15 extend back obliquely or diagonally and the dog 16 may be beveled back from the edge $16^a$ as indicated at $16^b$ thus permitting the plug to be turned inward without any separate manipulation of the dog to release the same, the dog merely snapping into the successive recesses and being pressed out of them by the cam or wedge action of the inclined faces $15^b$. The dog 16 is guided to slide in a radial way 17 at the top of the cup and it is carried at the upper end of a spring plate or bar 18, the lower end of which is clamped to the base of the cup by a clamp bolt and nut 19. In accordance with my invention cheek pieces 20, 21 extend out from the cup at each side of the spring plate 18 and fitting the same quite closely, these cheek pieces merging at their tops into the lug portions $17^a$ outstanding from the top of the cup which constitute the radial guide way 17 of the locking dog. The cheek portions 20, 21 have extending across and joining the tops thereof a bar portion 22 that is preferably V-shaped in cross section with its point extending in toward the head of the locking dog, the purpose of this bar being to guard and limit the outward movement of the dog, and its V-shaped section being of advantage in avoiding an accumulation of ice, mud or the like that might otherwise get between said bar and dog and prevent the dog from moving backward to release the plug. In accordance with my invention the cheeks 20, 21 have a passage 23 bored through the upper portions thereof in which is fitted to turn a pin 24 having a finger piece 25 projecting at one end thereof and preferably extending normally in general parallelism with the cup, as shown straight downward when the dog is in locking position. This pin has the portion thereof between the cheeks 20, 21 cut out to its center as indicated at 24ª leaving a flat seat extending diametrically thereof and on which the spring plate 18 rests when the dog is in locking position. This flat seat of the pin 24 is preferably alined with a seat boss 18ª on which the spring plate 18 is clamped so that with the use of a normally flat spring plate, said spring is under no appreciable tension when the dog is in locking position. Upon turning the pin 24 in either direction however the flat side of said spring being turned angularly against the spring plate will force the dog outwardly to release the plunger; thus it will be observed this release of the plunger will occur whether the finger piece 25 be pressed inward against the cup or pulled outward. Thus the release of the plunger for manipulation is most easily effected even though the hand of the operator may not be fully available as in numbness from cold or the like. It is to be noted that the described construction involves a minimum number of parts, the pin 24 being merely a plain round pin fitted to a plain bore through the cheeks 20, 21 and being held therein against endwise displacement by the engagement of the spring plate with its cut away intermediate portion. It is to be further noted that the described construction effectively guards the dog, its mounting and operating device against clogging up or interference with its functioning by ice, mud or other foreign matter, the dog itself fitting closely the guide way 17 at the top and being thus guarded, and the cheeks 20, 21 guarding the side of the dog and the spring plate 18 against the entry of foreign matter, this provision also serving to prevent meddlesome tampering with the device by prying under the spring plate or otherwise. It will be understood that the various details shown may be modified without departing from the spirit of the invention.

Thus while the plug 13 is shown as threaded for its entire length it may likewise be produced with threads only at its lower end portion if desired, likewise the finger piece 25 may extend to either or both sides of the pin. In general therefore the present embodiment is to be considered in all respects as illustrative and not restrictive, reference being had to the appended claims rather than to the foregoing description to indicate the scope of the invention.

Having described my invention, what I claim as new and desire to secure by Letters Patent is:

1. The combination with a grease cup and a plunger plug movably fitted therein and having a notch, of a spring mounted dog to engage such notch, the cup having projecting cheek portions serving as a guard and housing for said dog, and means for operating said dog consisting in a transversely mounted rotatable pin equipped with a finger piece mounted in said cheek portions and having a cut away intermediate portion engaging said dog.

2. The combination with a grease cup and a threaded plunger plug coöperative therewith having a notch extending the length thereof, of a spring mounted dog to engage such notch, and means for operating said dog consisting in a transverse rotatably mounted pin, equipped with a finger piece and cut away at an intermediate portion to present a flat diametrical face engaging the spring mounting of said dog.

3. The combination with a grease cup of a plunger plug threaded therein formed with a notch extending the length thereof presenting an abrupt shoulder at the forward side thereof and a sloping shoulder at the rear side thereof, and a spring mounted dog to engage such notch, the cup having projecting cheek portions at each side of the dog housing and guarding the same, and a transverse turning pin for operating said dog mounted in said cheek portions.

In testimony whereof, I have signed my name to this specification.

OSMON ROYAL.